Figure 1:
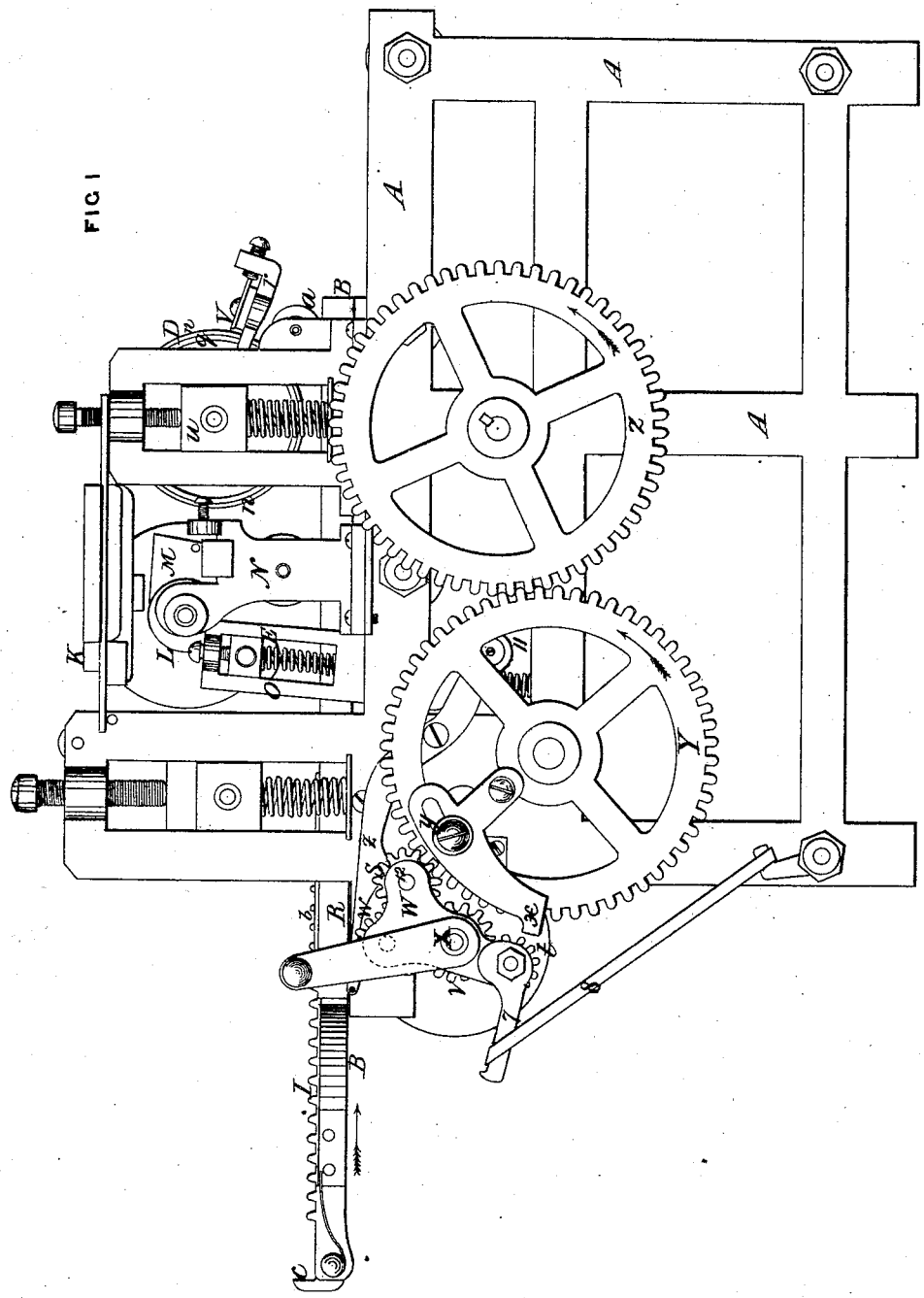

4 Sheets--Sheet 1.

R. NEALE.
Plate-Printing Press.

No. 162,677.  Patented April 27, 1875.

WITNESSES
John E. Laing
J H Rutherford

INVENTOR
Robert Neale
by Johnson and Johnson
his Atty's.

THE GRAPHIC CO.PHOTO-LITH.39 & 41 PARK PLACE,N.Y.

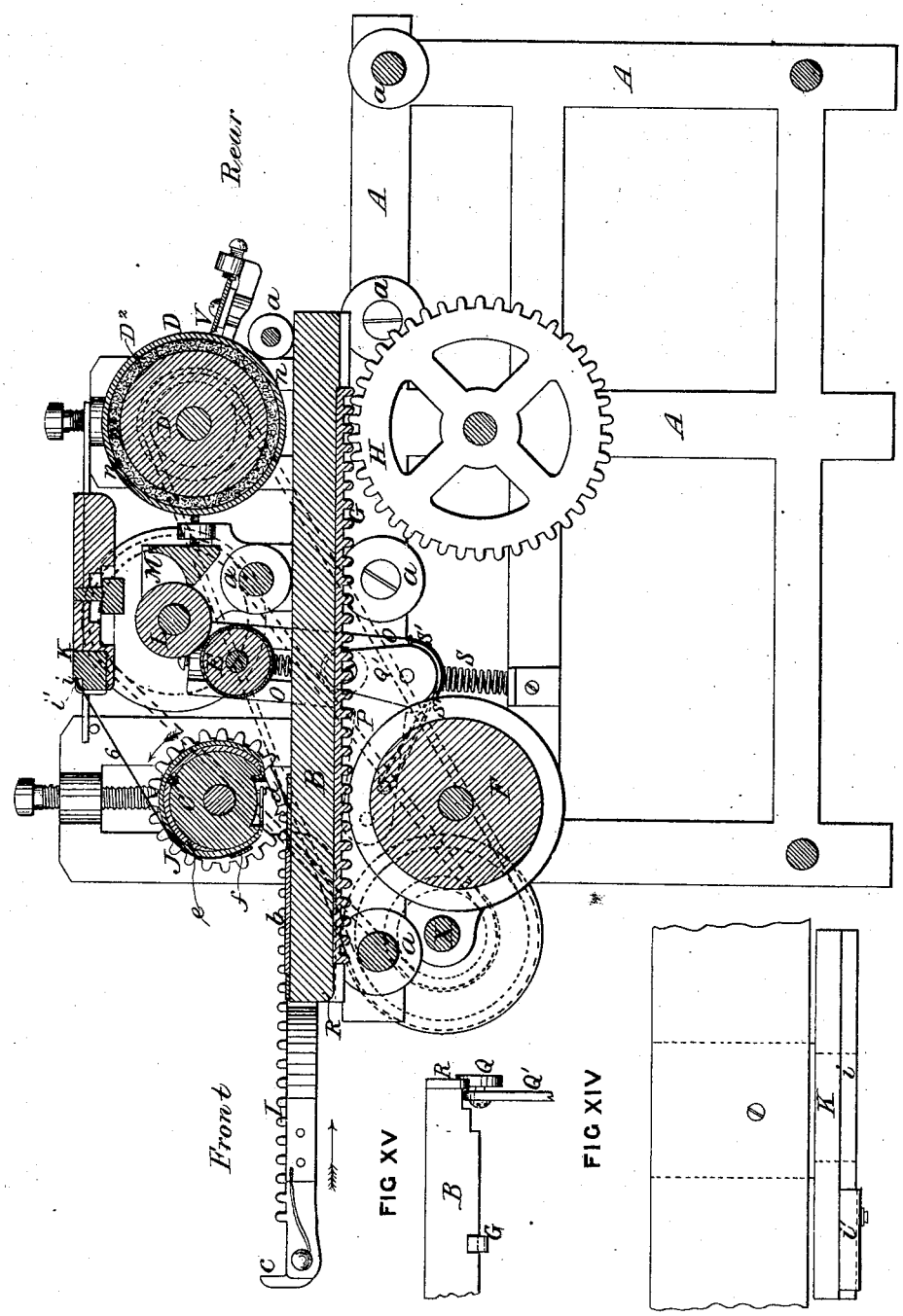

R. NEALE.
Plate-Printing Press.
No. 162,677.    Patented April 27, 1875.
4 Sheets--Sheet 3.
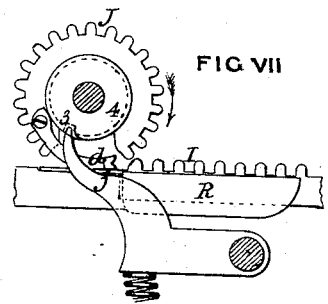
FIG VII
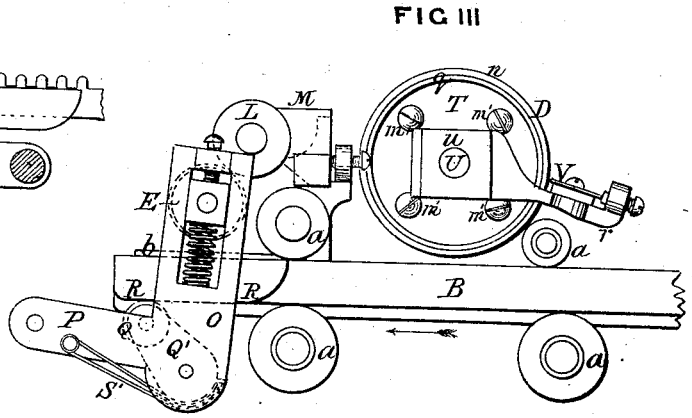
FIG III
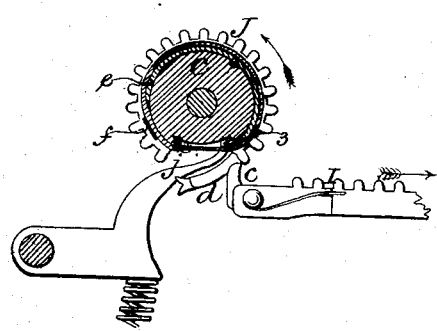
FIG IV
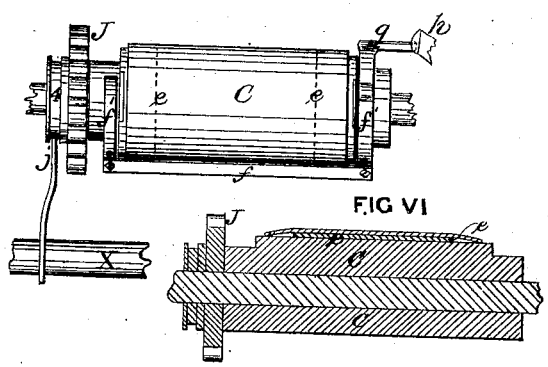
FIG V
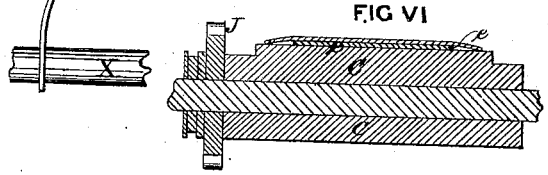
FIG VI
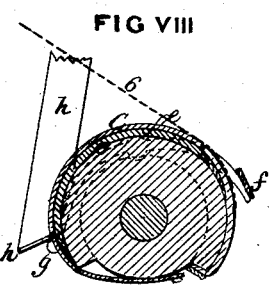
FIG VIII
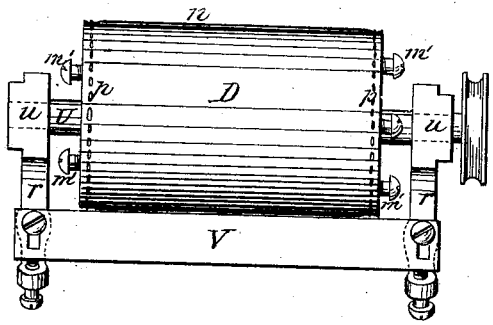
FIG IX
WITNESSES
John E. Laing
J. H. Rutherford
INVENTOR
Robert Neale
by Johnson and Johnson
his Att'ys
THE GRAPHIC CO. PHOTO-LITH. 39 & 41 PARK PLACE, N.Y.

R. NEALE.
Plate-Printing Press.
No. 162,677.
4 Sheets--Sheet 4.
Patented April 27, 1875.
FIG X
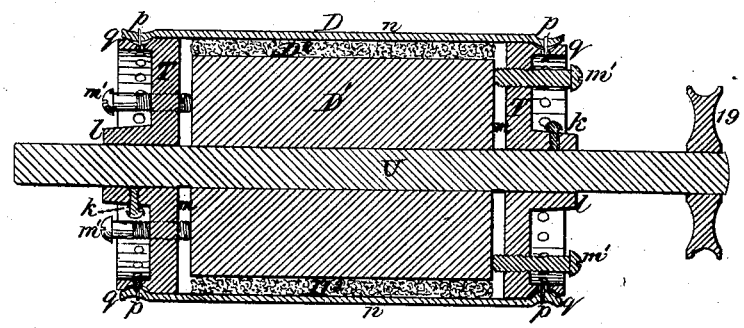
FIG XI
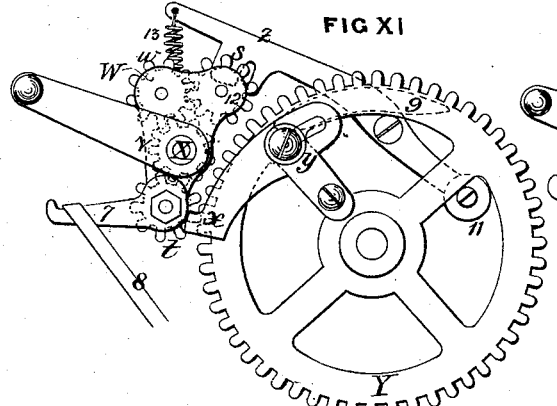
FIG XII
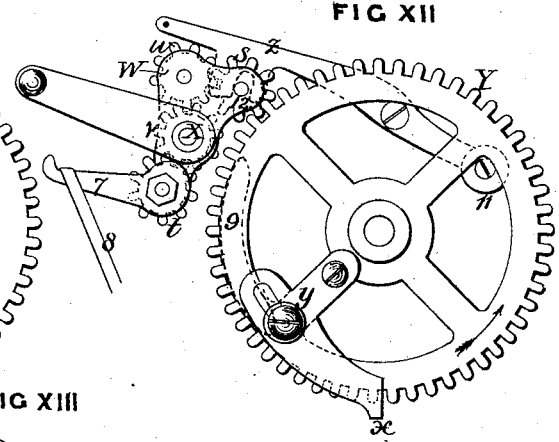
FIG XIII
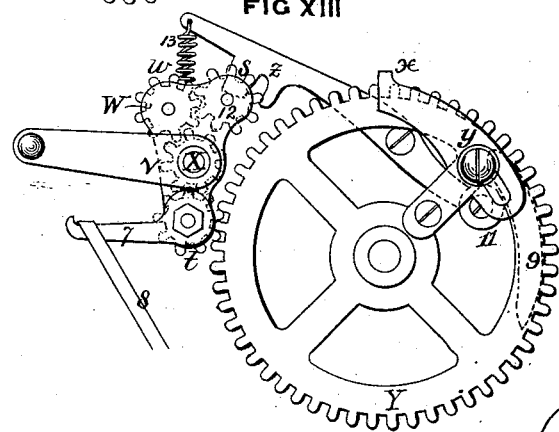
WITNESSES
John E. Laing
J. H. Rutherford
INVENTOR
Robert Neale
by Johnson & Johnson
his Attys
THE GRAPHIC CO.PHOTO-LITH.39 & 41 PARK PLACE,N.Y.

UNITED STATES PATENT OFFICE.

ROBERT NEALE, OF BROOKLYN, NEW YORK.

IMPROVEMENT IN PLATE-PRINTING PRESSES.

Specification forming part of Letters Patent No. 162,677, dated April 27, 1875; application filed November 10, 1874.

*To all whom it may concern:*

Be it known that I, ROBERT NEALE, of Brooklyn, in the county of Kings and State of New York, have invented certain new and useful Improvements in Plate-Printing Presses; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to plate-printing machines, in which the printing and plate-cleaning are effected at the opposite ends of the machine and during the reciprocating movement of the plate-carriage.

The invention consists, first, in a plate printing machine, in which the printing-roller is constructed with a flattened-surface section, the combination, with the printing-surface, of a shell-bolster for defining the bounds of the printing-surface in relation to the plate and the sheet, to prevent defacing the sheet by marginal marks; second, in the combination, in a plate-printing machine, in which the printing-roller is constructed with a flattened-surface section, and in which the printing-surface is provided with a shell-bolster, the combination, with said shell-bolster, of a griper having a continuous holding-edge, and co-operating with the bolster to hold the sheet at the termination of and within the shielding-circle made by the printing-bolster surface, to prevent the marking of the sheets by the griper during the operation of printing; third, in the combination, with an elevated table having an adjustable rabbet-rest for the sheet and a lateral adjustable plate, of the griper and the printing-roller, whereby the sheet is held upon the rabbet-rest, which thereby gages its relation to and insertion beneath the griper, and accommodates the action of the griper to different-sized sheets; fourth, in the combination, with a plate-griper, of arms arranged at the ends of the printing-roller, and by which the plate griper is carried, and upon which it is made adjustable, for the purpose of accurately fitting the griper-plate to the position of the roller-bolster, so that the surface of said plate-griper shall, when holding the sheet, always be within the outer circle of said bolster, while the arms allow the griper to be turned out from the cylinder-surface, and thus carry it free from the cylinder, and avoid the usual griper-fingers arranged to work in a groove in the cylinder-surface; fifth, in the combination, with the driving-gear wheel of the printing-roller and the carriage-rack, of a push-arm, hinged to and carried by said gear-wheel, the object whereof being to put the printing-roller into gear with the carriage-rack, to effect the rearward movement of the carriage; sixth, in the combination, in a plate-printing machine, in which the carriage with its plate has a reciprocating motion, and is provided with side pressing-bars, of swinging pallets and the inking-roll, upon the pivoted frames of which roll the pallets are mounted, and operate to bring the inking-roll into action upon the engraved plate as the carriage moves back, while upon its forward movement the pallets are swung over to the front side and out of the way, to prevent the action of the inking-roll when the plate is returning cleaned; seventh, in the combination, with the cleaning-cover of the cylinder, of the perforated rims of the cylinder-disks provided with circumferential grooves and perforations for interlacing the cover to the disks, whereby the covering is easily and and securely mounted tight and true with its acting-surface of greater diameter than its laced edges; eighth, in the combination, in a plate-printing machine, of the plate-carriage, having a horizontal reciprocating movement, and a frame of upper and lower pinions, capable of being changed in position upon the main shaft, a pinion on which drives the frame-pinions, with a carriage-rack and intermediate gear-wheels connecting therewith, and operating, by suitable devices, to disengage the intermediate gear from the driving-shaft to stop the machine for hand-work, or to turn the pivoted frame alternately, so as to produce, by its upper and lower pinions, a continuous movement to the plate-carriage for power-work; the pinions of the pivoted device intermatching with a pinion on the driving-shaft, and with the intermediate gear-wheels, to effect the purpose stated; ninth, in a plate-printing machine, the combination, with the turning-frame of pinions carried by the driving-shaft and provided with a lever-arm, of a cam carried by an intermediate gear-wheel connecting with the carriage-rack, whereby the lower pinion of the turning-frame is automatically disengaged from the intermediate gear to stop the machine for each impression, and the upper pinion put into gear by the lever-arm, for intermittent operation of the machine; tenth, in a plate-printing machine, the combination, with the pivoted pinion-frame carried by the main shaft, and a spring-pivoted catch on the main frame, of an adjustable and a fixed cam upon the intermediate gear-wheel, to automatically throw the lower pinion of said pivoted frame out of, and the upper pinion into, gear with the carriage-connecting gear, to render the movement of the carriage continuous for steam-power. The said adjustable cam, by its force and momentum in suddenly striking the lower end of the pivoted frame, forces the upper pinion in gear with the intermediate gear-wheel, and it is held in such position by the spring-catch, which is, in turn, tripped by the fixed cam.

In the accompanying drawings, Figure 1, Sheet 1, represents a side elevation of a plate-printing machine, embracing my invention; Figure 2, Sheet 2, a vertical longitudinal section of the same, the plate-carriage being shown in the position to move rearward to print the impression, receive the ink, and the action of the plate-cleaning cylinder; Fig. 3, Sheet 3, a detail elevation, showing the plate-carriage in the position of advancing with its cleaned plate free of the inking-roll; Fig. 4, same sheet, a detail section, showing the spring-catch at the end of the carriage-rack in a position to strike the teeth of the cog-wheel of the printing-roller and carry the cogs of said wheel clear of said rack, to allow of the return movement of the plate-carriage free of said wheel; Fig. 5, same sheet, a top view of the printing-roller and the paper-griper; Fig. 6, same sheet, a longitudinal section of the same; Fig. 7, same sheet, an end view of the same, with the detent shown locked with the roller; Fig. 8, same sheet, a cross-section of the same, showing the griper open; Fig. 9, same sheet, a top view of the plate-cleaning cylinder and its scraper; Fig. 10, Sheet 4, a longitudinal section of the plate-cleaning cylinder; Figs. 11, 12, and 13, same sheet, detail elevations of the reversing device for the plate-carriage; and Fig. 14, Sheet 2, a top view of the gage for the impression.

The frame A is of oblong form, properly braced, and with the plate-carriage B supported at the top thereof, and arranged to traverse back and forth upon and between side rolls $a$, mounted in the frame. The printing-roller C is mounted near the front, the cleaning-cylinder D near the rear, and the inking-roller E, intermediately therewith, upon this frame. The printing-plate $b$ is fixed upon the front portion of the carriage, and the latter is sustained under the printing-pressure by the lower large roll F. The carriage B is provided with a central longitudinal rack, G, into which matches a gear-wheel, H, Fig. 2, for giving the carriage its reciprocating movement by a reversing device, to be hereinafter described. The printing-roller C moves in harmony with the plate-carriage B by means of a rack or racks, I, on the carriage, and a cog-wheel, J, or wheels upon the printing-roller; and the connection between these parts is made and separated by the removal of a segment from the cog wheel J, as shown in Figs. 2 and 4, but this connection and separation are dependent upon the co-operation of a spring-catch, $c$, at the end of the carriage-rack I, and a hinged push-arm, $d$, carried by the said cog-wheel J, as will more fully appear hereinafter. The printing-roller C is of peculiar construction, consisting in the provision therewith of a bolster, $e$, for the printing-blanket, employed for the special object of relieving the edges of the plate and the griper $f$ from pressure while printing, and subjecting thereby only the engraved portion of the plate $b$ to the pressure of the roller. In effecting this the bolster $e$ must be of uniform thickness, but does not extend beneath the griper $f$, nor does it cover any more of the surface of the roller than is required by the engraved surface, (see Figs. 5 and 6,) so that it will not extend beyond the edges of the plate, but give the printing-surface of the blanket certain defined bounds, and by this means the picture will be free from being marred or defaced by contact with the edges of the plate. This bolster $e$ may be of any suitable material, such as rubber packing, or a metallic shell, and it is fastened by means of a cloth, with a blanket at the front edge, leaving the rear edge free beneath the blanket to prevent possible crimping, and so that it may be removed and replaced by others. Or this bolster-surface of the roller may be an unyielding metallic shell screwed to the roller-surface; but, of whatever material, it is only designed to form a segmental projection within certain limits for the purpose stated. The printing-roller C has the usual flattened-surface portion, to allow the plate-carriage to return unobstructed. The griper $f$ for the paper is mounted upon arms $f''f'$ secured to a spring-rod, by which it clamps the paper to the printing-blanket, and it is provided with an arm, $g$, Fig. 5, which in its revolution strikes a spring-catch, $h$, Figs. 5 and 8, on the frame to release the impression. Various-sized bolsters may be used for different sizes of work, and the griper $f$ may be adapted to hold cards or other small work. In connection with the griper I employ an adjustable gage-rest or table, K, for the paper or other article to be printed. It is supported above the roller C, and has a rabbet, $i$, Figs. 2 and 14, at its front edge, to form a seat, upon which to rest and gage the paper while inserting its lower end beneath the griper, and the lateral position of the paper is gaged by an adjustable plate, $i$, Fig. 14, seated upon the rabbet $i$, whereby I obtain a uniform margin of the impressions. The gages $i$ and $i'$ for this purpose can be set as desired. At each revolution of the printing-roller C it is arrested and held in proper position by means of a spring-detent, $j$, Figs. 4, 5, and 7, pivoted to the frame, so that its end enters a hole, 3, in a hub, 4, of the cog-wheel J, and its connection therewith is automatically relieved by the turning of the roller at the starting-point of each printing operation.

Upon the advance of the carriage to bring the plate $b$ in front of the cogs of the rack, I leave the cogs of the printing-roller wheel J, as shown in Fig. 2; and to again put them in gear, I combine with the space in the cogs of the wheel J a push-arm, $d$, pivoted to said wheel in a position to rest upon the carriage in the line of the rack I, and be struck by the inner end of said rack upon the backward movement of the carriage B, and thus bring the cog-wheel J and the rack I into gear; and as the roller C turns, the push-arm $d$ is brought up by it, and lies in the space of the cogs in a position to fall upon and pass over the rack I as the latter moves forward, and be in readiness to again engage the wheel as the carriage moves back. In this backward movement it is necessary to turn the cog-wheel a little farther than the rack I carries it, in order that the latter may be clear of the cogs of the wheel J in the return movement of the carriage, and for this purpose I arrange upon the outer end of the rack I a spring-catch, $c$, Figs. 2 and 4, pivoted to the rack-bar, and standing up above the level of the rack-teeth, so as to strike the last tooth in the space of the cog-wheel J and carry the last cog up out of the way, and at this moment lock the printing-roller C with the spring-detent $j$, and in position to receive the paper 6 for the next impression. In this way the printing-roller, turning always in the same direction, is engaged with the rack, and disengaged therefrom in its reciprocating movement.

The pivoted spring-catch $c$ is designed to yield inward should it strike the cogs of the wheel J in coming forward, so as not to turn the printing-roller out of its locked position.

The roll L of the ink-fountain M is mounted in bearings upon side standards N on the frame, and the roll E, which inks the plate $b$, receives its supply from the fountain-roll. This inking-roll E is mounted adjustably in bearings of side frames O, pivoted by arms P to the inner sides of the main frame, and is raised above the plate by springs S; and upon the lower ends of these frames O I arrange anti-friction rollers Q, carried by pivoted arms Q', to receive the action of side bars R of the carriage B, to depress the inking-roll E and bring it in contact with the engraved plate $b$ at each rear movement of the carriage. The carriers Q' of these rollers Q are pivoted, so as to be moved forward when struck by the bars R upon the advance of the carriage to carry them out of the way, as shown in Fig. 3, and thus prevent their action in such movement of the carriage. They are held in vertical position to depress the inking-roll E by spring S', which constantly tends to maintain them in upright positions, so that in the rear movement of the carriage they must receive the action of the side bars R, as shown in Fig. 2, and the return movement of the carriage automatically moves them downward in front out of action.

The cleaning-cylinder D is mounted in bearings in standards in rear of the inking devices, so that its surface must always be in position to bear upon the engraved plate in its passage beneath said cylinder, and for this purpose the journals of the cylinder are provided with suitable adjusting devices to give it proper control. This cleaning-cylinder D is of peculiar construction; and consists of end disks T, as shown in Fig. 10, secured upon the roller-shaft U, so as to be capable of axial adjustment thereon, and secured by clamp-screws $k$, passing through hubs $l$.

The core $D^1$ of the cylinder is of wood, of less diameter than the disks T, and the core $D^1$ does not join these disks, but there is a space, $m$, left between the latter and the ends of the core $D^1$, for a purpose to be presently stated. The axial adjustments of these disks T are made by set-screws $m'$, which, passing horizontally through the disks T, bear upon the opposite ends of the core $D^1$, so that by turning the set-screw $m'$ to the right the disks are set out. The surface of the core $D^1$ is provided with any suitable material, $D^2$, velvet-pile carpet being preferable, to form a yielding surface, on a plane, or thereabout, with the diameter of the disks. Over this surface, and secured to the circumference of the disks, is the cleaning-surface $n$ for the engraved plate. This covering I prefer to make of fine calf-skin, as being most durable, but any suitable material may be employed. It is secured by lacing-cords $p$, through perforations in the rims $q$ of the disks, and the outer surfaces of these rims are of less diameter than the supporting-surface for the covering, and grooved, as shown in Fig. 10, in order that the edges of the covering $n$ may be within the diameter of the plane of the surface and allow the laced ends of the covering to compactly hug the depressed portions of the rims $q$, and make a firm union therewith. The covering, thus set and secured, is made taut and kept in true form by drawing out the disks T by their set-screws $m'$, and which may be adjusted from time to time for the purpose of keeping the covering tight and true, as upon this depends the uniform action of its cleaning function. The carpet-pile bed $D^2$ for the covering gives advantage in causing the cleaning-surface to act with great accuracy and nicety, inasmuch as the peripheral point of contact is barely more than a line passing swiftly and lightly over the engraved plate, presenting a fresh and clean surface, so as to take off the ink with the least possible amount of contacting-surface, and thereby avoid a rubbing action, and hence a great saving in preventing the wear of the plate. A horizontal scraper, V, is arranged at the back of the cylinder D, and is adjustable so as to barely touch its surface. It is carried by two arms, $r$, extending out and slightly downward from the boxes $u$, and which are integral therewith, so that whatever adjustment is given to the cylinder it carries with it also the scraper, so as to keep it in proper position and avoid any inconvenience of a separate adjustment of the carrying-arms, as shown in Fig. 9.

As the carriage B reciprocates to bring the plate to the front in position for printing, and to carry it to the rear in position to receive the action of the cleaning-cylinder, I combine therewith a device for effecting this reciprocating movement without interfering with the continuous direction of the driving-motor. This device consists of a reversing-gear frame, W, mounted so as to be freely vibrated upon one end of the main driving-shaft X. It carries a series of pinions, two of which, one, $w$, above, and one, $t$, below, intermatch with a pinion $v$ on the driving-shaft X, while a third upper pinion, $s$, gears with the pinion $w$ to complete the series, one of which is put into and out of gear alternately with a large cog-wheel, Y, at the side of the main frame, and which matches with another large wheel, Z, on an axle which carries the cog-wheel H centrally with the carriage, to engage with the central rack G on the under side of said carriage, whereby the main shaft X has its connection with said carriage.

When the plate is at the front, the driving-pinions for the carriage are put out of gear with the large wheel Y, as shown in Fig. 11, by means of a cam, $x$, secured by a pivot and clamp-screw, $y$, to allow it to be adjusted to project the cam $x$ more or less beyond the wheel.

When the machine is thus used for hand-power, the cam $x$ is adjusted to strike the lower end of the reversing-frame W, and put and hold the lower pinion $t$ out of gear; but when the movement of the carriage is desired to be continuous, then the cam is set out farther from the wheel Y, so that, as said cog-wheel Y revolves, the cam will strike the lower end of the reversing-frame W, and bear it out to an extent that will bring the upper pinion $s$ into gear with said cog-wheel, and hold it in gear by a catch, $z$, pivoted to the main frame, and thereby carry the carriage backward, as shown in Fig. 12.

The pinion-reversing frame W is provided with an arm, 7, to which a spring, or weight, 8, is attached, which constantly tends to bear the lower pinion $t$ in gear with the cog-wheel Y, and this arm 7 serves as a lever, by which the reversing gear-frame may be reversed by hand at the will of the operator; while the disengagement of the upper pinion $s$ is effected automatically by a cam, 9, shown by dotted lines in Figs. 11, 12, and 13, on the inner side of the cog-wheel Y, which, as the latter revolves, strikes the inner arm 11 of said catch $z$, and releases a notch in its front from a locking-pin, 12, on the inner side of the reversible frame W, when the spring 8 instantly throws the lower pinion $t$ into gear again to reverse the movement and bring the carriage forward with the plate in position. By this reversing device the reciprocating movements of the carriage are controlled so as to be intermittent or continuous, but in either case the revolution of the main shaft X is not interrupted. The catch $z$ may be provided with a spring, 13, or weight, to force it down and interlock it with the pinion-frame when the pinion $s$ is put in gear. When the machine is worked with intermittent movements the griper $f$ is released by the operator pressing the spring-catch $h$, Figs. 5 and 8, from beneath the griper-arm $g$. The power is applied to the main shaft X by a pulley. The inking-rolls and the cleaning-cylinder are driven by belts, as shown by dotted lines in Fig. 2. It will be seen that the griper $f$ is a thin plate, made adjustable by means of the holes in the arms $f'$, and slots in the plate, through which the holding-screws pass, whereby the griper-plate is accurately fitted, so that it will always work within the outer circumference of the shell-bolster, and thereby be protected from marking the impressions. This capacity for adjustment is shown in Fig. 5. The arms $f'$ are arranged on the ends of the printing-cylinder, which gives the advantage of using a plate-griper with a continuous holding-edge for the paper; and also allows the griper to be turned out from the surface of the cylinder to adjust the plate upon the arms.

I claim—

1. In a plate-printing machine, in which the printing-roller is constructed with a flattened-surface section, the combination, with the printing-surface, of a shell-bolster, $e$, for defining the bounds of the impression, substantially as herein set forth.

2. The combination, with the impression-cylinder, of the shell-bolster $e$, and continuous griper $f$, correlated for conjoint action, substantially as herein described.

3. The combination, with an elevated table having an adjustable rabbet-rest, K $i$, for the sheet, and a laterally-adjustable plate, $i'$, on said rabbet, of the griper $f$ and the printing-roller, whereby the sheet is held upon the rabbet-rest, which thereby gages its relation to and insertion beneath the griper, and thus provide for the feeding of different-sized sheets to said griper, as herein set forth.

4. The combination of the adjustable griper-plate $f$ with the arms $f'$, whereby the plate is carried and made adjustable upon said arms, in the manner and for the purpose herein set forth.

5. The combination, with the driving-gear wheel J of the printing-roller and the carriage-rack I, of a hinged push-arm, d, carried by said gear-wheel, substantially as and for the purpose herein set forth.

6. The combination, in a plate-printing machine, in which the carriage with its plate has a reciprocating motion, and is provided with side bars R R, of the swinging pallets Q Q', and the inking-roll E, upon the pivoted frames O P whereof the pallets are mounted, and operate to bring the inking-roll into action upon the engraved plate, substantially as herein set forth.

7. The combination, with the cleaning-cover n of the perforated rims q, of the cylinder-disks, having circumferential grooves, and the interlacing p for said cleaning-cover, substantially as and for the purpose herein set forth.

8. The combination, in a plate-printing machine, of the plate-carriage B, having a reciprocating motion, and a swinging frame, W, carrying pinions w s t v, three of which have a changing movement with said frame upon the driving-shaft, and the lever-arm 7 of said frame, with the carriage-rack G and intermediate gear-wheels H Z Y, the last gearing with the pinion t s, and operated by cams to disengage the intermediate gear-wheels from the driving-shaft, to stop the machine to operate by hand-power, or to continue the operation for power-work, as herein set forth.

9. The combination, in a plate-printing machine, of the swinging-pinion carrying-frame W, supported on the driving-shaft, and provided with the lever-arm 7, with the cam x carried by the intermediate gear-wheel Y, connecting with the carriage-rack, whereby the lower pinion t is automatically disengaged from the intermediate gear to stop the machine and render its movement intermittent by the lever-arm 7, substantially as herein set forth.

10. The combination, in a plate-printing machine, of the pivoted pinion-frame W, carried by the main shaft, and a spring-catch, Z, of the adjustable cam x, and the cam 9 upon the intermediate gear-wheel, operating in conjunction with the intermediate gear to change the position of the upper and lower pinions, to render the movement of the plate-carriage continuous for steam-power, as herein set forth.

I testimony that I claim the foregoing I have affixed my signature in presence of two witnesses.

ROBERT NEALE.

Witnesses:
A. E. H. JOHNSON,
J. W. HAMILTON JOHNSON.